United States Patent [19]

Panoushek et al.

[11] Patent Number: 5,538,472
[45] Date of Patent: Jul. 23, 1996

[54] AGRICULTURAL VEHICLE CAB TEMPERATURE CONTROL SYSTEM

[75] Inventors: Dale W. Panoushek, Orion, Ill.; Calvin J. Kraning, Valley City, N. Dak.

[73] Assignee: Case Corporation, Racine, Wis.

[21] Appl. No.: 329,259

[22] Filed: Oct. 26, 1994

[51] Int. Cl.⁶ .............................. B60H 1/02; B60H 1/32
[52] U.S. Cl. ...................... 460/119; 460/150; 237/2 A; 237/12.3 R
[58] Field of Search ........................ 460/119, 149, 460/150; 237/2 A; 364/424; 165/2, 16

[56] References Cited

U.S. PATENT DOCUMENTS

| | | | |
|---|---|---|---|
| 3,682,240 | 8/1972 | Cira | 165/42 |
| 4,192,456 | 3/1980 | Shields et al. | 237/12.3 R |
| 4,352,456 | 10/1982 | Brandenburg, Jr. | 237/12.3 R |
| 4,642,770 | 2/1987 | Shirley | 364/424 |
| 5,085,267 | 2/1992 | Torrence | 165/2 |
| 5,127,576 | 7/1992 | Weatherhead et al. | 237/2 A |
| 5,137,213 | 8/1992 | Yamamoto et al. | 237/2 A |
| 5,211,333 | 5/1993 | Schmalenbach et al. | 237/2 A |
| 5,226,595 | 7/1993 | Devera et al. | 237/2 A |
| 5,244,035 | 9/1993 | Iida et al. | 165/16 |

FOREIGN PATENT DOCUMENTS

| | | |
|---|---|---|
| 79301430 | 7/1979 | European Pat. Off. . |
| 62-186871 | 7/1987 | Japan . |

Primary Examiner—Terry Lee Melius
Attorney, Agent, or Firm—Foley & Lardner

[57] ABSTRACT

A combine including an improved HVAC control system is disclosed herein. The frame of the combine supports an operator cab, a harvesting head and the other operational systems of the combine. The control system includes an operator control located at the roof of the cab and a heat exchanger located at the floor of the cab. An interface circuit is electrically coupled to the control circuit and the heat exchanger valve to control the amount of heat output by the heat exchanger. A cooling coil may also be located at the floor of the cab, wherein the control and interface circuit cooperate to control the associated coolant compressor.

27 Claims, 2 Drawing Sheets

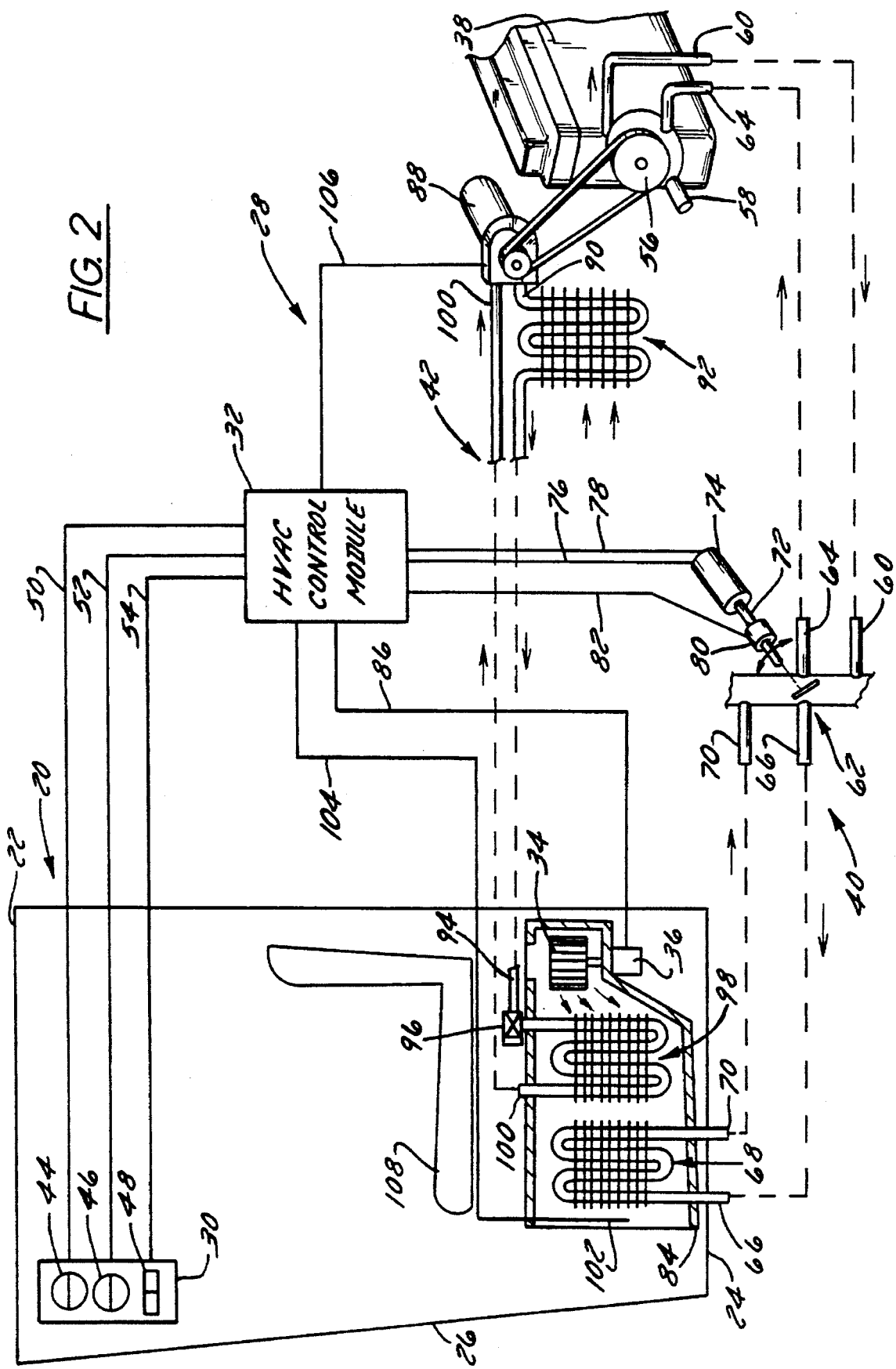

5,538,472

AGRICULTURAL VEHICLE CAB TEMPERATURE CONTROL SYSTEM

FIELD OF THE INVENTION

The present invention relates to temperature control in an agricultural vehicle. In particular, the present invention relates to an electronic control electromagnetically linked to an energy transfer mechanism located in the cab of an agricultural vehicle.

BACKGROUND OF THE INVENTION

Operation of off-road and agricultural vehicles is simplified by locating operator controls which require viewing near the line of sight of the operator. As a result, heating and cooling controls, and the energy transfer mechanisms associated therewith (heating and cooling heat exchangers) in vehicles such as combines have conventionally been located at the center and top of the operator cab near the line of sight of the operator. In particular, the control knobs, the blower, and the heat exchangers are typically at the top and center of the cab. In this configuration, the blower and heat exchangers are positioned at the same location as the control knobs to simplify the mechanical link between the control knobs and the heat exchanger valves. Another reason the blower and heat exchangers are located at the top center of the cab is to provide a relatively efficient use of cab space.

In view of the advantages of locating the heating controls and associated heat transfer devices at the top and center of a cab, there are some disadvantages. One disadvantage of locating the heat exchangers at the top and center of the cab is that the cost of providing water and refrigerant lines to the coils is relatively high. More specifically, in a combine, the hot water source (engine) and refrigerant source (refrigerant compressor on the engine) are relatively distant from the top and center of the cab. However, if the heat exchangers and associated valves are displaced from the control knobs, the routing of the mechanical link therebetween becomes difficult and expensive. Another disadvantage caused by locating the heating coil at the top and center of the cab is the inability to effectively heat the lower portions of the cab (i.e. at the operator's feet).

In view of the disadvantages which are the result of locating the heat exchangers at the top and center of the operator cab in a combine, it would be desirable to displace the heat exchangers from the control knobs to a location such as below the operator seat which is lower in the cab and closer to the engine.

SUMMARY OF THE INVENTION

The present invention relates to an agricultural vehicle such as a combine. The vehicle includes an agricultural implement, and an operator cab supported by the vehicle frame. The operator cab includes a roof, a floor and a front window supported between the roof and the floor, and a heat exchanger supported generally at the floor of the cab. The heat exchanger is coupled to a heated liquid source displaced from the cab. To control the heat input to the cab, the heat exchanger is configured to output varying amounts of heat energy. An electrically operated valve assembly including at least one electrical input couples the liquid source to the heat exchanger. The valve controls the flow of heated liquid from the source to the heat exchanger in response to electric control signals applied to the electrical input. An operator control is supported generally at the roof of the cab, and includes a first operator interface configured to produce heat signals representative of the desired heat energy output of the heat exchanger. An interface circuit is electromagnetically coupled to the valve assembly and the operator control, and applies electric control signals to the valve based upon the heat signals.

The present invention further relates to an agricultural vehicle including harvesting means and an operator cab supported by the vehicle frame and tires. The operator cab includes a roof, a floor and a front window supported between the roof and the floor. The vehicle also includes a supply means for providing a source of heated liquid to a heating means located generally at the floor of the cab. A valve means couples the heating means to the supply means and controls the flow of heated liquid to the heating means in response to electric control signals, thereby allowing the heating means to produce varying amounts of heat energy. A control means is supported generally at the roof of the cab for producing heat signals representative of a desired heat energy output. An interface means is coupled to the valve assembly and the operator control for applying the electric control signals to the valve means based upon the heat signals.

BRIEF DESCRIPTION OF THE DRAWINGS

FIG. 2 illustrates the temperature control system.

DETAILED DESCRIPTION OF TEMPERATURE CONTROL SYSTEM

Figure 1:
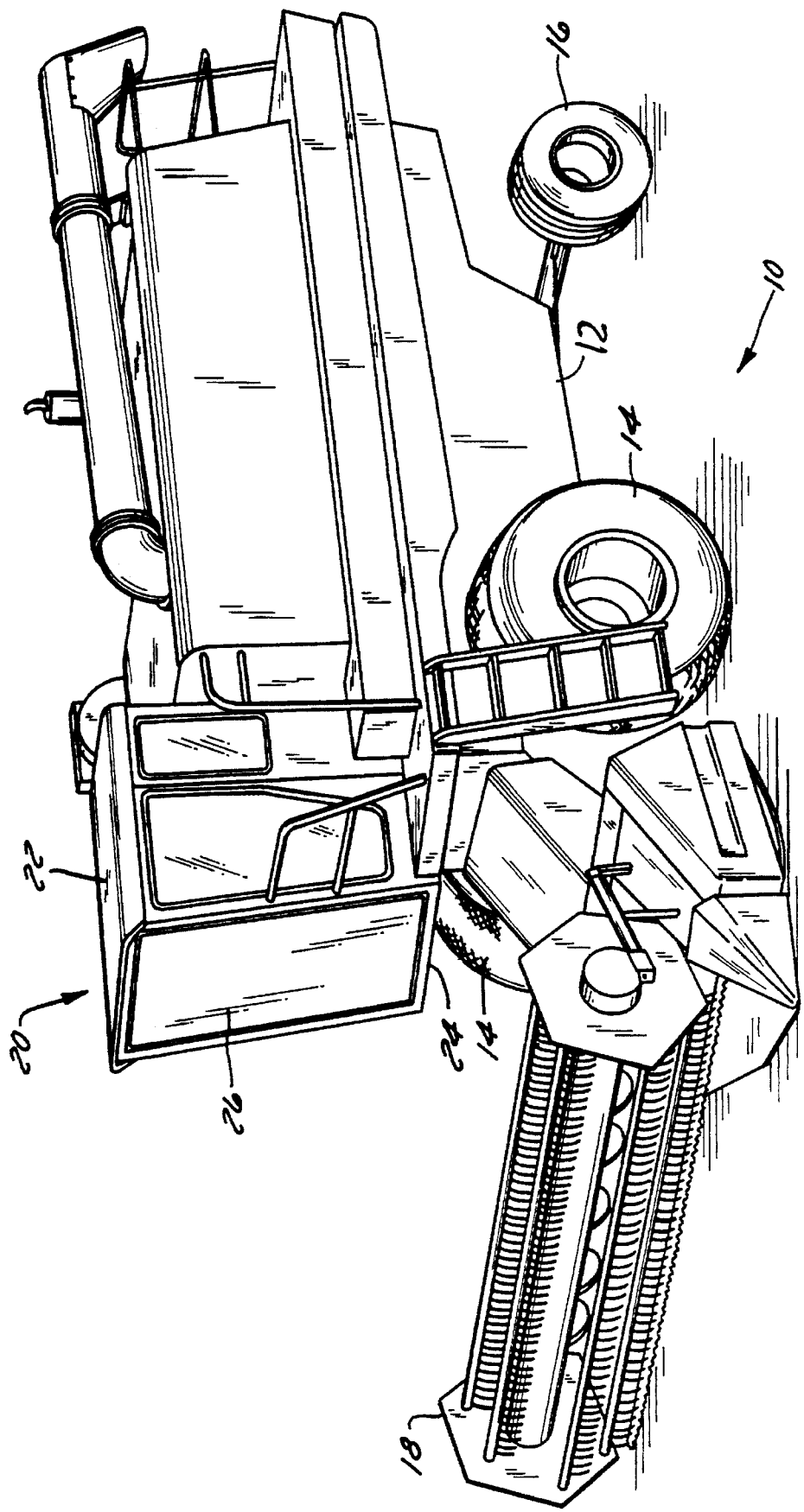
FIG. 1 illustrates a combine including an embodiment of a temperature control system of the present invention.

Referring to FIG. 1, the temperature control system of the present invention is associated with an agricultural vehicle 10 including a vehicle frame 12 supported by a plurality of tires 14, 16, an agricultural implement 18 for harvesting grain and supported by frame 12, and an operator cab 20, at a location elevated above implement 18 and supported by vehicle frame 12. Operator cab 20 has a roof 22, a floor 24, and a front window 26 supported between roof 22 and floor 24. Vehicle 10 moves in a first direction when grain harvesting implement 18 is operational for harvesting, and implement 18 and cab 20 are generally located at the front of vehicle 10 relative to the first direction.

Referring now to FIG. 2, a heating valve and air conditioning (HVAC) temperature control system 28 includes an operator control 30, an HVAC control module 32, a blower fan 34 and associated motor 36 for rotation thereof, an engine 38 supported by frame 12, a heating circuit 40, and a cooling circuit 42. In operation, an occupant manipulates operator control 30 to send desired control signals to HVAC control module 32, wherein, module 32 applies control signals to heating circuit 40 and cooling circuit 42 for controlling the temperature of blower discharge air into cab 20 for controlling the comfort level therein.

Operator control 30 includes a rotatable temperature command signal generator 44, a rotatable blower fan speed command signal generator 46, and an air conditioning (A/C) on/off switch 48. In the presently preferred embodiment, generators 44 and 46 include rotary potentiometers of generally known type; however, any suitable device for providing a variable command signal can be used. Generator 44 and generator 46 apply analogue temperature and blower control signals to HVAC module 32 along conductors 50, 52, respectively, and A/C switch 48 applies digital A/C control signals to module 32 along a conductor 54.

Engine 38 provides a heat source for a heat transfer fluid such as an antifreeze mixture. An engine driven water pump 56 receives heat transfer fluid from the engine cooling radiator (not shown) through a primary inlet 58 and discharges heat transfer fluid to engine 38 through internal passages therebetween. Water pump 56 has an auxiliary outlet which provides the flow of heat transfer fluid through a conduit 60 to the inlet of a butterfly control valve 62, having a return flow through a conduit 64 to an auxiliary return of water pump 56. Control valve 62 has an auxiliary outlet connected through a conduit 66 to an inlet of a heater core 68 for providing the flow of heat transfer fluid thereto. The heat transfer fluid is circulated through heater core 68 and is returned to an auxiliary inlet of valve 62 through a conduit 70.

Control valve 62 is operatively connected to a rotatable shaft 72 driven by a valve motor 74 (e.g. stepping motor or D.C. motor). Motor 74 receives clockwise and counterclockwise valve rotation control signals from HVAC module 32 along conductors 76, 78, and rotates shaft 72 either in a clockwise or counter-clockwise rotation for controlling the amount of heat transfer fluid flowing through heater core 68. As control valve 62 is rotated by shaft 72, a position feedback module 80 generates an analog valve position signal that is sent to HVAC control module 32 along a lead 82. In the presently preferred practice, position feedback module 80 includes a rotary potentiometer with its wiper connected to move with shaft 72 for sensing the rotary position thereof.

Heater core 68 is disposed in a blower housing 84 which has blower 34 in one end thereof drawing in air through a side vent and driven by motor 36 for discharging air over heater core 68. Heater core 68 is heated upon circulation of the heat transfer fluid and heats air blown through heater core 68 into cab 20. Blower motor 36 receives blower motor control signals along a conductor 86 from HVAC control module 32. In the present embodiment, the blower motor signal is a PWM signal with a frequency of 16 KHz and a duty cycle ranging from 18.75% to 100% in 6.25% increments resulting in 14 speeds.

For purposes of cooling circuit 42, engine 38 is appropriately coupled to a compressor 88 (e.g. via a belt and pulley drive) to provide rotational motion thereto. Compressor 88 compresses a refrigerant such as ammonia or Freon, which is then directed out of compressor 88 through a conduit 90 to an inlet of an ambient condenser 92, typically located in front of the engine cooling radiator. Condenser 92 liquifies the high pressure refrigerant supplied by compressor 88 and directs the liquified refrigerant through a conduit 94 to an inlet of a thermal expansion valve 96 of an evaporator 98, wherein evaporator 98 directs refrigerant through a conduit 100 for return of re-vaporized refrigerant to compressor 88.

Evaporator 98 is disposed in blower housing 84 between blower 34 and heater core 68. Evaporator 98 is cooled upon expansion of the refrigerant supplied thereto by expansion valve 96 and cools air blown through evaporator 98 with the assistance of blower 34. A discharge air temperature sensor 102 in the form of a thermistor is disposed adjacent the downstream or discharge edge of refrigerant evaporator 98 for sensing the temperature of the air passing over evaporator 98. Temperature sensor 102 generates analog evaporator temperature signals that are sent to HVAC control module 32 along a conductor 104. HVAC module 32 sends control signals to compressor 88 along a lead 106 to control engagement and disengagement of the compressor clutch (not shown).

HVAC control module 32 preferably includes an appropriately configured microprocessor including circuitry for analog-to-digital conversion, PWM signal generation, amplification and filtering. HVAC control module 32 is disposed to monitor the operator controlled temperature, blower, and A/C control signals along with the sensed valve position and evaporator temperature signals. In response to the aforementioned input signals, HVAC module 32 applies representative output blower motor signals, valve rotation signals, and compressor clutch signals as will be described later in the operation of HVAC temperature control system 28.

Included within cab 20 is an operator seat 108 supported at floor 24 above heater core 68, refrigerant evaporator 98 and blower fan 34. Operator control 30 is supported generally at roof 22 above front window 26. This spacial management within cab 20 eliminates the need to direct antifreeze and refrigerant lines to roof 22 while still allowing control 30 to be visible and accessible to an operator of vehicle 10.

The operation of HVAC temperature control system 28 will now be discussed. At each start-up of system 28, control module 32 calibrates water valve butterfly position sensor 80 by fully closing butterfly valve 62 and reading corresponding valve position signal, and then fully opening valve 62 and reading the corresponding valve position signal again.

Blower command signal generator 46 may be rotated between a fully clockwise position and a predetermined angle (e.g. 40° of rotation) for maximum to minimum fan speed. If blower command signal generator 46 is off, then HVAC control module 32 will close water butterfly valve 62 or turn off compressor 88 if one or both of them are on.

If blower command signal generator 46 is on and temperature command signal generator 44 is set from a predetermined angle $\Theta$ (e.g. 45°) counter-clockwise of center to fully clockwise (e.g. 0°), where fully clockwise is maximum heat, HVAC control module 32 turns on water valve motor 74 to open water valve butterfly 62. When butterfly position sensor 80 equals the temperature command, HVAC control module 32 turns off valve motor 74. If generator 44 is set between angle $\Theta$ and fully counter-clockwise, water butterfly valve 62 is closed.

If blower command signal generator 46 and A/C switch 48 are on and if generator 44 is set between angle $\Theta$ and fully counterclockwise, where fully counter clockwise is maximum cooling, HVAC control module 32 turns on compressor 88. When temperature sensor 102 equals the temperature command, HVAC control module 32 turns off compressor 88. If generator 46 and A/C switch 48 are on and if generator 44 is set between angle $\Theta$ and fully clockwise, both heater water valve 62 and compressor 88 are on at the same time.

Although the invention has hereinabove been described with respect to the illustrated embodiments, it will be understood that the invention is capable of modification and variation, and is limited only by the following claims. For example, the invention may be embodied in a vehicle supported by tracks extending around the vehicle wheels, or in a tractor.

What is claimed is:

1. An agricultural vehicle comprising:

a frame supported by a plurality of wheels;

an agricultural implement supported by the frame;

an operator cab supported by the frame, the operator cab including a roof, a floor and a front window supported between the roof and the floor;

a heated liquid source;

a first heat exchanger supported generally at the floor of the cab and configured to output varying amounts of heat energy;

an electrically operated valve assembly including at least one electrical input and disposed to couple the liquid source to the heat exchanger, the valve controlling the flow of heated liquid from the source to the heat exchanger in response to electrical control signals applied to the electrical input;

an operator control supported generally at the roof of the cab, the operator control including a first operator interface configured to produce heat signals representative of the desired heat energy output; and an interface circuit electromagnetically coupled to the valve assembly and the operator control, the interface circuit applying the electrical control signals to the valve based upon the heat signals;

wherein the valve assembly further includes a position feedback signal generator coupled to the interface circuit and the interface circuit applies electrical control signals to the valve assembly based upon a comparison of the feedback signals to the heat signals.

2. The vehicle of claim 1, wherein the valve assembly includes a fluid valve coupled to a motor driven positioner and the feedback position signal generator, the positioner being coupled to the interface circuit to control the flow of fluid through the valve based upon the electrical control signals.

3. An agricultural vehicle comprising:

a frame supported by a plurality of wheels;

harvesting means for harvesting vegetation, the harvesting means being supported by the frame;

an operator cab supported by the frame including a roof, a floor and a front window supported between the roof and the floor;

supply means for providing a source of heated liquid;

heating means supported generally at the floor of the cab for producing varying amounts of heat energy;

valve means for coupling the heating means to the supply means and controlling the flow of heated liquid to the heating means in response to electrical control signals;

control means supported generally at the roof of the cab for producing heat signals representative of a desired heat energy output; and interface means coupled to the valve assembly and the operator control for applying the electrical control signals to the valve means based upon the heat signals;

wherein the valve means further includes a position feedback signal generator coupled to the interface means and the interface means applies electrical control signals to the valve means based upon a comparison of the feedback signals to the heat signals.

4. The vehicle of claim 3 wherein the valve means includes a fluid valve coupled to a motor driven positioner and the feedback position signal generator, the positioner being coupled to the interface means to control the flow of fluid through the valve based upon the electrical control signals.

5. An off-road vehicle comprising:

a frame supported by a plurality of wheels;

an operator cab supported by the frame, the operator cab including a roof, a floor and a front window supported between the roof and the floor;

a heated liquid source;

a first heat exchanger supported generally at the floor of the cab and configured to output varying amounts of heat energy;

an electrically operated valve assembly including at least one electrical input and disposed to couple the liquid source to the heat exchanger, the valve controlling the flow of heated liquid from the source to the heat exchanger in response to electrical control signals applied to the electrical input;

an operator control supported generally at the roof of the cab, the operator control including a first operator interface configured to produce heat signals representative of the desired heat energy output; and an interface circuit electromagnetically coupled to the valve assembly and the operator control, the interface circuit applying the electrical control signals to the valve based upon the heat signals;

wherein the valve assembly further includes a position feedback signal generator coupled to the interface circuit and the interface circuit applies electrical control signals to the valve assembly based upon a comparison of the feedback signals to the heat signals.

6. The vehicle of claim 5, further comprising an operator seat supported at the floor, wherein the first heat exchanger is located below the operator seat.

7. An agricultural vehicle comprising:

a frame supported by a plurality of wheels;

an agricultural implement supported by the frame;

an operator cab supported by the frame, the operator cab including a roof, a floor and a front window supported between the roof and the floor;

a heated liquid source;

a first heat exchanger supported generally at the floor of the cab and configured to output varying amounts of heat energy;

an electrically operated valve assembly including at least one electrical input and disposed to couple the liquid source to the heat exchanger, the valve controlling the flow of heated liquid from the source to the heat exchanger in response to electrical control signals applied to the electrical input;

an operator control supported generally at the roof of the cab, the operator control including a first operator interface configured to produce heat signals representative of the desired heat energy output;

an interface circuit electromagnetically coupled to the valve assembly and the operator control, the interface circuit applying the electrical control signals to the valve based upon the heat signals;

the valve assembly further including a position feedback signal generator coupled to the interface circuit and the interface circuit applying electrical control signals to the valve assembly based Upon a comparison Of the feedback signals to the heat signals;

an engine supported by the frame;

an air conditioning compressor operatively coupled to the entwine and electromagnetically coupled to the interface circuit;

a second heat exchanger located in the cab and coupled to the compressor to provide a conduit for receiving a flow of cooling fluid from the compressor; and a second operator interface coupled to the interface circuit and configured to produce a cooling request signal, the interface circuit applying a cooling control signal to the compressor based upon the cooling request signal.

8. The vehicle of claim 7, further comprising a temperature sensor disposed adjacent to the second heat exchanger and electromagnetically coupled to the interface circuit, the sensor producing a temperature signal representative of the temperature of the air adjacent the second heat exchanger, and the interface circuit applying the cooling signal to the compressor based upon the cooling request signal and the temperature signal.

9. The vehicle of claim 7, wherein the interface circuit is included in the operator control.

10. The vehicle of claim 9 further comprising an operator seat supported at the floor, wherein the first and second heat exchangers are located below the operator seat.

11. The vehicle of claim 10, wherein the vehicle moves in a first direction when the implement is operational for harvesting, and the implement is supported by the frame at the front of the vehicle relative to the first direction.

12. The vehicle of claim 11, wherein the cab is located at generally the front of the vehicle at a location elevated above the implement.

13. The vehicle of claim 12, wherein the implement is a grain harvesting head.

14. An agricultural vehicle comprising:

a frame supported by a plurality of wheels;

harvesting means for harvesting vegetation, the harvesting means being supported by the frame;

an operator cab supported by the frame including a roof, a floor and a front window supported between the roof and the floor;

supply means for providing a source of heated liquid;

heating means supported generally at the floor of the cab for producing varying amounts of heat energy;

valve means for coupling the heating means to the supply means and controlling the flow of heated liquid to the heating means in response to electrical control signals;

control means supported generally at the roof of the cab for producing heat signals representative of a desired heat energy output;

interface means coupled to the valve assembly and the operator Control for applying the electrical control signals to the valve means based upon the heat signals;

the valve means further including a position feedback signal generator coupled to the interface means and the interface means applies electrical control signals to the valve means based upon a comparison of the feedback signals to the heat signals;

an engine supported by the frame;

an air conditioning compressor operatively coupled to the engine and electromagnetically coupled to the interface means;

cooling means for cooling the cab, the cooling means being located in the cab and coupled to the compressor to receive a flow of cooling fluid from the compressor; and switch means coupled to the interface means for producing a cooling request signal, the interface means applying a cooling control signal to the compressor based upon the cooling request signal.

15. The vehicle of claim 14, further comprising a temperature sensor disposed adjacent to the cooling means for producing a temperature signal representative of the temperature of the air adjacent the cooling means, the interface means applying the cooling signal to the compressor based upon the cooling request signal and the temperature signal.

16. The vehicle of claim 14, wherein the interface means is included in the control means.

17. The vehicle of claim 16, further comprising an operator seat supported at the floor, wherein the heating means and cooling means are located below the operator seat.

18. The vehicle of claim 17, wherein the vehicle moves in a first direction when the harvesting means is operational for harvesting, and the harvesting means is supported by the frame at the front of the vehicle relative to the first direction.

19. The vehicle of claim 18, wherein the cab is located at generally the front of the vehicle at a location elevated above the harvesting means.

20. The vehicle of claim 19, wherein the harvesting means is a grain harvesting head.

21. An off-road vehicle comprising:

a frame supported by a plurality of wheels;

an operator cab supported by the frame, the operator cab including a roof, a floor and a front Window supported between the roof and the floor;

a heated liquid source;

a first heat exchanger supported generally at the floor of the cab and configured to output varying amounts of heat energy;

an electrically operated valve assembly including at least one electrical input and disposed to couple the liquid source to the heat exchanger, the valve controlling the flow of heated liquid from the source to the heat exchanger in response to electrical control signals applied to the electrical input;

an operator control supported generally at the roof of the cab, the operator control including a first operator interface configured to produce heat signals representative of the desired heat energy output;

an interface circuit electromagnetically coupled to the valve assembly and the operator control, the interface circuit applying the electrical control signals to the valve based upon the heat signals;

the valve assembly further including a position feedback signal generator coupled to the interface circuit and the interface circuit applying electrical control signals to the valve assembly based upon a comparison of the feedback signals to the heat signals;

an engine supported by the frame;

an air conditioning compressor operatively coupled to the engine and electromagnetically coupled to the interface circuit;

a second heat exchanger located in the cab and coupled to the compressor to provide a conduit for receiving a flow of cooling fluid from the compressor; and a second operator interface coupled to the interface circuit and configured to produce a cooling request signal, the interface circuit applying a cooling control signal to the compressor based upon the cooling request signal.

22. The vehicle of claim 21, further comprising an operator seat supported at the floor, wherein the first and second heat exchangers are located below the operator seat.

23. The vehicle of claim 21, further comprising a harvesting implement supported by the frame, wherein the vehicle moves in a first direction when the implement is operational for harvesting, and the implement is supported by the frame at the front of the vehicle relative to the first direction.

24. The vehicle of claim 23, further comprising a temperature sensor disposed adjacent to the second heat exchanger and electromagnetically coupled to the interface circuit, the sensor producing a temperature signal representative of the temperature of the air adjacent the second heat exchanger, and the interface circuit applying the cooling signal to the compressor based upon the cooling request signal and the temperature signal.

25. The vehicle of claim 24, wherein the valve assembly includes a fluid valve coupled to a motor driven positioner and the feedback position signal generator, the positioner being coupled to the interface circuit to control the flow of fluid through the valve based upon the electrical control signals.

26. The vehicle of claim 25 wherein the interface circuit is included in the operator control.

27. The vehicle of claim 26, wherein the cab is located at generally the front of the vehicle at a location elevated above the implement.

* * * * *